United States Patent

Guhl et al.

[19]

[11] Patent Number: 6,103,088
[45] Date of Patent: Aug. 15, 2000

[54] PROCESS FOR PREPARING BISMUTH COMPOUNDS

[75] Inventors: Dieter Guhl, Speyer; Frank Honselmann, Weingarten, both of Germany

[73] Assignee: Goldschmidt Ag., Essen, Germany

[21] Appl. No.: 09/177,002

[22] Filed: Oct. 22, 1998

[30] Foreign Application Priority Data

Oct. 22, 1997 [DE] Germany .................... 197 46 471

[51] Int. Cl.$^7$ .................................... C25D 3/00
[52] U.S. Cl. .................. 205/252; 205/253; 205/254; 205/766; 204/DIG. 13
[58] Field of Search .................. 205/252, 253, 205/254, 766; 204/DIG. 13

[56] References Cited

U.S. PATENT DOCUMENTS 5,227,046  7/1993  Murphy et al. .................. 205/252

FOREIGN PATENT DOCUMENTS 0 715 003 A1  6/1996  European Pat. Off. .
08246200     9/1996  Japan .
WO 93/07309  4/1993  WIPO .
WO 95/25008  9/1995  WIPO .

OTHER PUBLICATIONS

Japanese Abstract of Patent Jp 02088790 of Mar. 28, 1990 by Morimoto et al.
Abstract of Japanese Patent Appln. No. 07074665, published Sep. 24, 1996.
Abstract of Japanese Patent Appln. No. 63–238305, published Mar. 28, 1990.
Biedorf, Rolf, et al., "Alternative Lote–Galvanische Abscheidung von Zinn–Wismut–Legierungen", in *Galvanotechnik,* 85, No. 12 (1994) at pp. 4187–4191.
R. Eidenschink et al., "Uber die galvanische Abscheidung von Wismut auf Aluminium und Stahl", in *Metalloberflache,* (1996), pp. 173–174.

*Primary Examiner*—Arun S. Phasge
*Attorney, Agent, or Firm*—Scully, Scott, Murphy & Presser

[57] ABSTRACT

The invention provides a process for preparing bismuth compounds, in particular a process for preparing highly concentrated solutions of bismuth methanesulfonate, that are stable to hydrolysis.

The preparation takes place from aqueous solutions of bismuth compounds of the formula (I)

$$BiX_3 \qquad (I)$$

by subjecting acid of the formula (II)

$$HX \qquad (II)$$

where

X is the anion of a mineral acid, an organic acid radical, fluoroborate, hexafluorosilicate or cyanide, in an electrolytic cell, to electrolytic dissolution of the anode with metallic bismuth as the anode.

6 Claims, No Drawings

PROCESS FOR PREPARING BISMUTH COMPOUNDS

FIELD OF THE INVENTION

The invention relates to a process for preparing bismuth compounds, in particular to a process for preparing highly concentrated solutions of bismuth methanesulfonate that are stable to hydrolysis.

BACKGROUND OF THE INVENTION

The coating of metallic materials, such as copper, steel or aluminum, with metallic tin or tin alloys, especially tin-lead alloys, is widespread in numerous applications in electroplating. The objective of the coating may be, for example, to afford protection to the substrate against corrosion and tarnishing, to enhance soldering properties, or to improve the slip properties of the metal surface. In order to be able to apply such an alloy coating, either with or without electric current, it is necessary to have stable solutions of the requisite metal salts in a relatively wide concentration range for the formulation of the coating bath. And, indeed, this is the case for tin and lead and other common alloy components.

Against the background of the increasing recovery of the metallic constituents from electrical or electronic components, the importance is gaining of those electrocoating processes which can be used to produce toxicologically unobjectionable alloys. The replacement of lead by another metal in tin alloys is the subject of diverse efforts. Against this background, the metal bismuth is attracting particular interest as a partner to tin in alloys. As a result, tin-bismuth alloys prepared by metallurgical means are now already being used to an increasing extent as a replacement for toxicologically objectionable tin-lead alloys.

Suitability for use as an electrocoating for material is possessed above all by those metal salts which can be dissolved in water easily and in almost infinitely adjustable concentrations. Particular preference is given to aqueous solutions, since electrocoating baths are, more and more, being regulated by means of automatic metering pumps.

In terms of the practical use of bismuth salts as a constituent of alloying baths, these properties lead to considerable problems in that they considerably restrict the use concentrations and the scope for formulation. In electrocoating baths, the Bi contents are well below 100 g/l along with very high acid contents at the same time. In an electrocoating bath which is used for producing an alloy coat there is no need for a high metal concentration. For products intended for use as raw material for electrocoating baths, however, it is indeed an important characteristic. High metal salt concentrations are important so that not too much water is introduced into the electrocoating bath when the metal content is refreshed.

Nevertheless, a number of bath formulations are known. For the electrodeposition of bismuth on aluminum and steel, a bath is described that is based on bismuth perchlorate or bismuth chloride with the sodium salt of ethylenediaminetetraacetic acid ($Na_2EDTA$) (Eidenschink, Dommain, Metalloberfläche [Metal surface], Volume 20, 1966, pp.173/ 174). The bismuth perchlorate is obtained by dissolving basic bismuth carbonate in excess perchloric acid or by anodic dissolution of metallic bismuth.

The electrodeposition of tin-bismuth alloys on the basis of tetrafluoroboric acid electrolytes is described by Drescher et al. (Galvanotechnik, 85 (1994), 4187–4191). The alloying electrolyte is obtained by dissolving bismuth oxide or bismuth carbonate. Enrichment by anodic dissolution of bismuth at high current densities is a further possibility.

JP 08246200 A teaches the preparation of tin(II) sulfate and bismuth sulfate by the electrolysis of solutions in sulfuric acid, with tin or bismuth anodes, using an anion exchange membrane.

In Patent Abstracts of Japan, C-730, 1990, Vol. 14, No. 282.JP-2-88790A describes the preparation of aqueous electroplating solutions based on bismuth/tin compounds. This entails subjecting acids such as sulfuric acid or organic sulfonic acids, an example being an alkanesulfonic acid, to electrolytic dissolution of the anode using metallic bismuth as anode. In this case, the bismuth ions removed from the solution by the electrocoating process are replaced continuously by the bismuth ions forming at the anode, do that a virtually constant concentration of bismuth ions is established which allows a stable electrocoating process.

EP 0 715 003 A teaches that stable baths for depositing a tin-bismuth alloy based on solutions in methanesulfonic acid can be prepared by adding various complexing agents, such as gluconic acid, citric acid and others, although the origin of the Bi content is not specified.

WO95/25008 describes the use of electrolytes containing bismuth chloride for the coating of copper, where the bismuth is introduced in the form of the oxide and it is necessary to ensure a large excess of acid.

Preparation of salts takes place in accordance with the prior art by dissolving bismuth oxide or basic bismuth carbonate in the concentrated acid. When carrying out this process it is necessary to ensure that there is always a sufficiently large excess of acid present, since, when dissolved in water, bismuth salts of strong inorganic acids undergo immediate hydrolysis in accordance with the following equation:

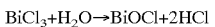

$$BiCl_3 + H_2O \rightarrow BiOCl + 2HCl$$

A similar reactivity has been described for the sulfates and nitrates of bismuth as well (see e.g. F. A. Cotton, G. Wilkinson, Anorganische Chemie [Inorganic Chemistry], 4th edition, Verlag Chemie, pages 449–494). If a bismuth salt solution prepared in concentrated acid is diluted with water or another electrolyte, hydrolysis again takes place.

For example, a stable solution of bismuth sulfate can be prepared only by dissolving $Bi_2O_3$ in 50% strength sulfuric acid. An attempt at dissolving it in dilute sulfuric acid, such as 10% strength acid, leads directly to bismuthyl sulfate, which is obtained as an insoluble precipitate.

Electrocoating processes based on the use of highly concentrated bismuth salt solutions are unknown. As demonstrated by the examples, the starting point is either solid oxides or carbonates, which leads to increased manual effort, or the desired bismuth concentration is generated in situ. Generating the bismuth content in situ also has disadvantages. Firstly, soluble anodes as a source of Bi are vital, which on the one hand necessitates their production and recycling and on the other hand leads to the formation in the electroplating bath of insoluble fractions, which may be highly disadvantageous for the quality of coating. Furthermore, the soluble anodes may not be dimensionally stable, which leads to a change in the current density distribution in the electroplating bath and so likewise to undesirable effects on the thickness distribution of the electrodeposited coat.

Processes for preparing highly concentrated bismuth salt solutions, especially those based on methanesulfonic acid, which can then be diluted in use to the desired concentration, on the other hand, are not known.

WO 93/07309 teaches that using bismuth anodes and tin-containing electrolytes based on methanesulfonic acid it is possible by anodic oxidation to introduce bismuth ions into the electrolytes, the Bi content remaining in the order of 10 g/l.

BRIEF SUMMARY OF THE INVENTION

The problem of the present invention, by contrast, is to provide a process which in particular enables stable, highly concentrated and infinitely dilutable bismuth metal salt solutions to be provided in simple and economical form.

This problem is solved by a process for preparing highly concentrated aqueous solutions, which are stable to hydrolysis, of a bismuth compound of the formula (I)

$$BiX_3 \quad (I)$$

wherein acid of the formula (II)

$$HX \quad (II)$$

where

X is the anion of a mineral acid, an organic acid radical, fluoroborate, hexafluorosilicate or cyanide is subjected in an electrolytic cell to electrolytic dissolution of the anode with metallic bismuth as the anode.

DETAILED DESCRIPTION OF THE INVENTION

For use in electrocoating, salts of bismuth with the following anions are particularly preferred: sulfates, chlorides, nitrates, alkanesulfonates, especially methanesulfonates, hydroxyethanesulfonates, sulfosuccinates, toluenesulfonates, fluoroborates, phosphates, hexafluorosilicates and cyanides.

In accordance with the invention, the acid of the formula (II) is preferably employed in a concentration of from 20 to 70% by weight.

A further problem of the invention is to provide a process which allows easy and economical access to highly concentrated solutions of bismuth methanesulfonate that are stable to hydrolysis.

To this extent the prior art is represented, as already described, by the chemical dissolution of bismuth oxide or bismuth carbonate in methanesulfonic acid. With that process it is possible to prepare solutions that are able to contain not more than 380 g of bismuth methanesulfonate per litre of solution. At the same time, about 160 g of free methanesulfonic acid are still present. Preparing a solution having this concentration is difficult, since the bismuth base material must be metered in very carefully. If too much of the Bi base material is added there may well be instances of irreversible precipitation. The metering rate must not exceed about 1 g/min for a volume of 100 ml, which is disadvantageous for an industrial implementation.

It is not possible to raise the content of bismuth methanesulfonate above the concentration of 380 g/l by adding further bismuth oxide or carbonate or hydroxide. Clear solutions are no longer obtained. A sediment of white bismuthyl methanesulfonate is formed. Nor does raising the temperature lead to any improvement in solubility. According to conventional understanding, this content should constitute the solubility maximum. The surprising finding of the present invention, however, is that by means of electrochemical processes it is possible to obtain much higher contents of Bi salt. The contents of bismuth methanesulfonate, for example, can amount to much more than 600 g/l.

It was unforeseeable that the electrochemically prepared solutions might differ in their contents from those of the chemically prepared solutions, since in the normal course of things chemical solubility is identical with electrochemical solubility. By means of the present invention it has been demonstrated, at least for the claimed bismuth salts, that this is not the case. The essence of the present invention therefore lies in the availability of Bi salt solutions which, relative to the prior art, contain considerably more bismuth than was thought to have been possible in accordance with the prior art.

In accordance with the invention, electrochemical preparation directly from the bismuth metal is proposed. The metal is incorporated as electrode material into electrolysis cells, it being indispensible for the anode material to consist of bismuth. The cathode material consists preferably of bismuth, but may alternatively consist of stainless steel or graphite or another conductive material that is resistant to the electrolyte. The electrolyte used is preferably the acid whose metal salt is to be obtained. The construction of an electrolysis cell is familar to the person skilled in the art. Some common types of electrolysis cell which are suitable for the present purpose have been described by Scott, Electrochemical processes for clean technology, The Royal Society of Chemistry, Cambridge, 1995. Either membrane-containing or membrane-free electrolysis cells of appropriate construction can be employed. The dissolution of the metal at the anode takes place in accordance with the following reaction:

$$Bi \rightarrow Bi^{3+} + 3e^-$$

The cathode reaction can be formulated as follows:

$$3H_2O + 3e^- \rightarrow 1.5H_2 + 3OH^-$$

It was surprisingly possible to find that, in the electrochemical dissolution of bismuth in, for example, methanesulfonic acid, it is possible to obtain bismuth methanesulfonate solutions whose contents are much higher than those obtainable by the chemical dissolution process. With the aid of the present invention it is possible to prepare bismuth salt solutions whose contents are 100 g/l or more. Solutions of this concentration can barely be employed as electrocoating baths. The solutions obtained are stable on storage and are infinitely dilutable with deionised water. A bismuth methanesulfonate solution prepared by the process of the invention had a content of about 630 g/l bismuth methanesulfonate and about 200 g/l free methanesulfonic acid. The content was therefore almost twice as high as in the case of a solution of chemical origin. This finding is surprising insofar as it could not have been expected that the solubility of the bismuth methanesulfonate would be so much higher than suggested by the preparation attempts based on chemical dissolution. Even with other bismuth salts this form of behavior could not be found. For instance, although bismuth sulfate solution is obtainable by chemical dissolution of bismuth, the attempt at an electrochemical dissolution leads not to a solution of high content but, in contrast, to much lower contents. In comparison with other metals, as well, such behavior could not have been expected.

In accordance with the invention it is preferred to employ metallic bismuth in the form of powder, shot, needles, scrap, wire, rods, wool, foils or sheets.

Typically, in an electrolysis cell, several kg of metallic bismuth in the form of lumps or ingots are introduced and anodically contacted. The cathode employed is metallic Bi in the form of a plate or rod. The cell is filled with an aqueous solution of the acid—methanesulfonic acid, for example—as electrolyte. Subsequently, current is applied from a direct voltage source. The preferred range of current strength lies between 2 and 20 A/dm$^2$, the preferred voltage between 4 and 20 V. After about 24 hours, the temperature of the electrolyte has risen to about 55° C. A sample of the electrolyte is taken and analysed. The content of bismuth methanesulfonate, for example, is >600 g/l. The electrolysis can be operated continuously by withdrawing concentrated metal salt solution from an appropriate point in the electrolysis cell and topping up the cell with methanesulfonic acid, for example, accordingly. The solutions obtained in this way are stable in storage and can be diluted infinitely with water without any disruptive precipitates. The reaction can be carried out, for example, at a temperature in the range from 15 to 100° C. over the course of from 4 to 20 hours at a voltage of from 3 to 15 V and with a current of from 2 to 20 A/dm$^2$. Particularly high concentrations of the aqueous solutions are obtainable by separating the anode chamber from the cathode chamber by means of ion exchange membranes, diaphragms, microfilters or constructional measures.

The examples which follow describe the invention in more detail:

EXAMPLE 1

Chemical Preparation of Bismuth Methanesulfonate Solution

A reaction vessel was charged with 56 g of 70% strength methanesulfonic acid and 31 g of deionised water and this initial charge was heated to 80° C. Subsequently, bismuth oxide was added slowly and in portions. Any instances of turbidity occurring were dissolved by raising the temperature to about 105° C. Following the addition of a maximum of 16 g of bismuth oxide, the solution was saturated with bismuth methanesulfonate. Further addition of bismuth oxide led to a bismuthyl methanesulfonate deposit which could no longer be dissolved. The solution had the following contents:

bismuth methanesulfonate: 380 g/l free methanesulfonic acid: 160 g/l

EXAMPLE 2

Dilution Test

The solution obtained in Example 1 was diluted 1:10 with deionised water. The solution was stable.

EXAMPLE 3

Electrochemical Preparation of Bismuth Methanesulfonate Solution

An electrolysis cell was charged with 1.2 l of methanesulfonic acid having a concentration of 500 g/l. The anode employed was about 4 kg of metallic bismuth in the form of lumps, the cathode a stainless steel sheet with a surface area of about 20 cm$^2$. Electrolysis was carried out for 24 h at 8 A (approximately 3 A/dm$^2$) and 12 V, the internal temperature of the cell rising to 50° C. The evaporation losses were compensated by means of water. About 400 ml of electrolyte were withdrawn and analysed:

Density: 1.53 kg,

Bi content: 270 g/l,

Bi methanesulfonate content: 637 g/l, free methanesulfonic acid: 200 g/l

The 400 ml of electrolyte were supplemented in the form of methanesulfonic acid solution at 500 g/l, and the electrolysis was continued. After a further 24 h at 10 A (approximately 3.7 A/dm$^2$) and 13 V, a further 400 ml of electrolyte were withdrawn. Analysis showed:

Density: 1.55 kg,

Bi content: 275 g/l,

Bi methanesulfonate content: 638 g/l, free methanesulfonic acid: 198 g/l.

EXAMPLE 4

Dilution Test 100 g of the solution obtained in accordance with Example 3 were diluted 1:10 and 1:100 with deionized water. After 6 months, the solutions were stable and clear.

What is claimed is:

1. A method for preparing a concentrated, hydrolysis stable, aqueous solution of bismuth methanesulfonate, comprising subjecting methanesulfonic acid, in an electrolytic cell with a metallic bismuth anode, to electrolytic dissolution of said anode, wherein an aqueous solution of bismuth methanesulfonate having a concentration of at least 600 grams per liter is produced.

2. The method of claim 1 wherein said methanesulfonic acid is employed in a concentration range of from 20 to 70% by weight.

3. The method of claim 1 wherein said metallic bismuth anode is in the form of a powder, shot, needles, scrap, wire, rods, wool, foil or sheets.

4. The method of claim 1 wherein said electrolytic dissolution is carried out at a temperature in the range of from 15° C. to 100° C. for a time period of from 4 to 20 hours at a voltage of from 3 to 15 V and at a current of from 2 to 20 A/dm$^2$.

5. The method of claim 1 wherein said metallic bismuth anode is in an anode chamber, said anode is separated from a cathode of said electrolytic cell by an ion exchange membrane, diaphragm, microfilter or constructional measure.

6. The method of claim 1 wherein said bismuth methanesulfonate solution is withdrawn from the electrolytic cell and made up continuously or batchwise with fresh methanesulfonic acid.

* * * * *